(12) United States Patent
Behnamrad et al.

(10) Patent No.: US 7,896,186 B2
(45) Date of Patent: Mar. 1, 2011

(54) CLOSURE CAP FOR THE FILLER NECK OF A RESERVOIR AND FILLER NECK THEREFOR

(75) Inventors: Kazem Behnamrad, Winnenden (DE); Robert Rauleder, Korb (DE)

(73) Assignee: Reutter Metallwarenfabrik GmbH, Waiblingen (DE)

( * ) Notice: Subject to any disclaimer, the term of this patent is extended or adjusted under 35 U.S.C. 154(b) by 856 days.

(21) Appl. No.: 10/577,432

(22) PCT Filed: Oct. 6, 2004

(86) PCT No.: PCT/EP2004/011142

§ 371 (c)(1),
(2), (4) Date: Jan. 3, 2007

(87) PCT Pub. No.: WO2005/049359

PCT Pub. Date: Jun. 2, 2005

(65) Prior Publication Data

US 2007/0210086 A1     Sep. 13, 2007

(30) Foreign Application Priority Data

Nov. 14, 2003    (DE) .......................... 203 18 043 U (51) Int. Cl.
     *B65D 41/06*    (2006.01)
     *B65D 41/36*    (2006.01)
     *B65D 47/02*    (2006.01)

(52) U.S. Cl. ................ 220/295; 220/86.2; 220/203.26; 220/DIG. 33

(58) Field of Classification Search .............. 220/86.2, 220/203.05, 203.24–203.26, 295
See application file for complete search history.

(56) References Cited

U.S. PATENT DOCUMENTS 5,395,004 A   *   3/1995   Griffin et al. ................. 220/295

(Continued)

FOREIGN PATENT DOCUMENTS

DE     1 981 149     3/1968

(Continued)

*Primary Examiner*—Harry A Grosso
(74) *Attorney, Agent, or Firm*—Bacon & Thomas, PLLC (57) ABSTRACT

A closure cap for the filler neck of a reservoir, in particular, one for fuel or motor oil for e.g. motor vehicles, comprising a grip and a rotating lifting device whose first part (sealing part) facing the grip is provided with a sealing ring and whose other part (tightening part), which faces away from the grip and which is provided with detent lugs serving to engage under a closure cap of the filler neck, can be turned relative to the filler neck when the closure cap undergoes a turning motion. The other part (tightening part) can, when the grip undergoes a turning motion, be axially displaced relative to the first part (sealing part) of the rotating lifting device against the force of a spring. This axial displacement is such that, in the closed position of the closure cap on the filler neck of the sealing ring provided on the first part (sealing part), the tightening part is pressed against a sealing surface of the filler neck, and during the movement of the grip, an axial play exists between the sealing surfaces of the sealing ring and filler neck, whereby the first part (sealing part), with the axially acting sealing ring remains, when the closure cap undergoes a turning motion relative to the filler neck, unturnable with the filler neck by means of a turning closing connection.

12 Claims, 7 Drawing Sheets

U.S. PATENT DOCUMENTS 5,615,793 A * 4/1997 Muller .................. 220/295

FOREIGN PATENT DOCUMENTS

| DE | 2 120 525 | | 11/1972 |
| DE | 30 05 419 | C2 | 8/1981 |
| GB | 546775 | A * | 7/1942 |

* cited by examiner

000000000# CLOSURE CAP FOR THE FILLER NECK OF A RESERVOIR AND FILLER NECK THEREFOR

FIELD OF THE INVENTION

The present invention relates to a closure cap for the filler neck of a container, in particular of a container for fuel or motor oil, for instance for motor vehicles.

BACKGROUND OF THE INVENTION

In one such closure cap, known from German Patent DE 30 05 419 C2, for a fuel tank, a grip is connected axially and in a manner fixed against relative rotation to one part (sealing part) via a coaxial closing tube, about which closing tube another part (tightening part) is retained axially movably, counter to the action of a spring, in the form of two diametrically opposed locking lugs. A spacer sleeve is disposed between the one part and the other part. The one part carries the sealing ring, which in the locked state of the closure cap rests sealingly on the sealing face of the filler neck.

When this known closure cap, introduced into the filler neck, is manipulated, and upon locking or unlocking rotation relative to the filler neck, the closure cap is pressed together with the sealing ring against the sealing face of the filler neck. Since with the rotation of the grip the sealing ring is also rotated relative to the filler neck, the sealing ring rubs to a greater or lesser extent against the sealing face of the filler neck, depending on the force expended by the user. Although because of the rotary lifting device the known closure cap is designed such that before and after the closing position, an axial play is intrinsically possible between the sealing ring and the sealing face of the filler neck, nevertheless, its existence depends on the use by the user. Moreover, a further increase in the friction of the sealing ring relative to the sealing face of the filler neck can occur if the sealing ring swells from the influence of fuel or hot oil, so that the axial play is reduced still further. Moreover, the spacer sleeve that must additionally be provided is complicated.

SUMMARY OF THE INVENTION

The object of the present invention is therefore to provide a closure cap for the filler neck of a container of the type defined at the outset which prevents friction between the closure cap sealing ring and the sealing face of the filler neck regardless of the use by the user and which is embodied more simply.

By means of the provisions of the invention, it is attained that the sealing ring of the closure cap, together with the part that contains the rotation-locking connection, remains stationary upon rotation of the closure cap, or in other words remains nonrotatable relative to the filler neck, so that whether or not the user on rotating the closure cap expends an axial pressure, no friction whatever can occur between the sealing ring and the sealing face of the filler neck. This also means that even if the seal might have swollen, no additional expenditure of force by the user upon rotation is necessary. Moreover, a closure cap of this kind can be used without modification in the currently usual designs of filler necks, which are typically provided with a locking sliding block.

An advantageous structural feature with regard to the one part provided with the rotation-locking connection and its mounting to the grip is obtained in that the one part (sealing part), provided with at least one rotation-locking connection element), is solidly connected to a radial flange which is retained axially immovably but rotatably in the grip.

Advantageous features with regard to the other part, provided with the locking lugs, and to the connection of the two parts of the rotary lifting device are obtained in that the other part (tightening part), provided with the locking lugs, is embodied as a ring element and is disposed plunging axially partway into a ring element of the one part (sealing part), in that the two ring elements, on their regions plunging into one another, are provided with sliding-block elements, acting in the direction of rotation, in the form of at least one sliding-block path and at least one cam, and in that the one part (sealing part) and the other part (tightening part) are penetrated by a shaft, which is connected in a manner fixed against relative rotation to the grip on one end and to the other part (tightening part) on the other.

Particularly for a closure cap made of plastic, advantageous features with regard to the structural embodiment of the relative rotatability of the two parts to one another are obtained in that the spring is disposed in the form of a compression spring between the other part (tightening part) and the shaft, in that the shaft is a cylindrical body, which is provided with a cover plate and whose open end, by means of axial slots engaging via ribs of the grip, forms a rotation-locking connection with the grip on the one hand, and whose closed end, by means of fingers axially protruding from the cover plate and engaging inner axial recesses of the other part (tightening part 18), forms a rotation-locking connection with the other part on the other hand; and in that the shaft enters into an axially acting detent connection with the one part (sealing part).

Since the locking lugs on the one hand and the rotation-locking connection elements on the other do not cooperate directly with one another, they can advantageously be embodied as of equal width, in accordance with the locking lugs of the other part (tightening part) and the rotation-locking connection elements of the one part (sealing part) each have approximately the same width in the circumferential direction.

Because the sealing ring is not subject to any motion friction whatever but instead exerts solely an axial motion on the sealing face of the filler neck, it is possible according to the sealing ring being embodied as a molded part, with toothed sealing face regions optionally oriented toward the filler neck.

The invention also relates to an underpressure ventilation device, particularly on a closure cap and in that the shaft on the outer circumference has a sealing ring disk, which is axially retained on the inner edge on the shaft and is placed on the outer edge against an axial sealing face on the one part (sealing part) with intrinsic tension.

By these provisions, not only is container ventilation at underpressure obtained, but also an especially low-friction sealing between the shaft and the sealing part of the one part.

An advantageous feature of the sealing ring disk is obtained in that the sealing ring disk is embodied as curved convexly toward the axial sealing face, so that a certain two-dimensional sealing action, although narrow, is achieved.

By the disposition and optionally adjustable axial bracing of the annular bead in that on the side of the sealing ring disk remote from the axial sealing face, an annular bead is disposed on the other part (tightening part), in a region between the inner and outer edges of the sealing ring disk, and in that the annular bead is disposed at a slight axial spacing from the applicable face region, oriented toward it, of the sealing ring disk, it is attained in a simple way that at a negative pressure in the container, the rubber seal comes free from the sealing face on the annular edge by a hinging motion, and in that case the underpressure that trips the ventilation can be selected as a function of the location of the annular bead.

The invention furthermore relates to a filler neck of a container, in particular a container for fuel or motor oil for motor vehicles, for instance, especially for use with a closure cap of a container, in particular of a container for fuel or motor oil, for instance for motor vehicles, in particular for use with a closure cap as having a sealing face surrounding the neck opening and having a closure base, which is disposed inside the neck opening and is axially offset relative to the sealing face, the closure base having preferably two diagonally disposed receiving slots, characterized in that the sealing face is formed by a flat or plane annular sealing face.

Such closure caps have a convexly curved annular sealing face in order to achieve a tight closure of the filler neck with the ring seal of the closure cap. This kind of sealing face of the filler neck can essentially be attained only by means of a metal filler neck, or at least a metal outer part of a filler neck, because only then can such a convex sealing face be created in an economical way. Moreover, the filler necks that were previously conventional are provided on their closure base or its lower edge with a sliding-block path, along which the locking lugs slide in the usual closure caps. This too is relatively complicated to manufacture.

The object of the present invention is therefore to provide a filler neck of a container of the type defined above that can be manufactured substantially more simply and thus considerably less expensively.

In other words, a filler neck of this kind, or the end piece of a filler neck, can essentially be manufactured from arbitrary materials and in particular as a cast or molded part, which is provided with a flat or plane annular sealing face or is provided by postmachining. a flat annular sealing face is several millimeters wide and may then be provided, so that as already mentioned above, a closure cap seal can be embodied as a molded part that acts two-dimensionally.

In a further advantageous feature, the underside of the closure base is a flat or plane annular-segmental face, and the filler neck, at least in the region of the neck opening and of the closure base, is a cast or molded part. These, which additionally leads to a further simplification of the filler neck, since the previously necessary sliding-block path can also be dispensed with, so that once again, a cast or molded part that need not be machined or needs only insignificant machining, can readily be used.

BRIEF DISCRIPTION OF THE DRAWING

Further details of the invention can be learned from the ensuing description, in which the invention is described and explained in further detail in terms of the exemplary embodiments shown in the drawings. Shown are.

DESCRIPTION OF THE PREFERRED EMBODIMENTS

The closure cap 10 shown in the drawing serves the purpose of gas-tight, liquid-tight, and pressure-tight closure of a filler neck 11 of a container 12, in particular a fuel tank for motor vehicles, but also of a motor oil container for motor vehicles and for such containers in stationary systems.

Figure 1:
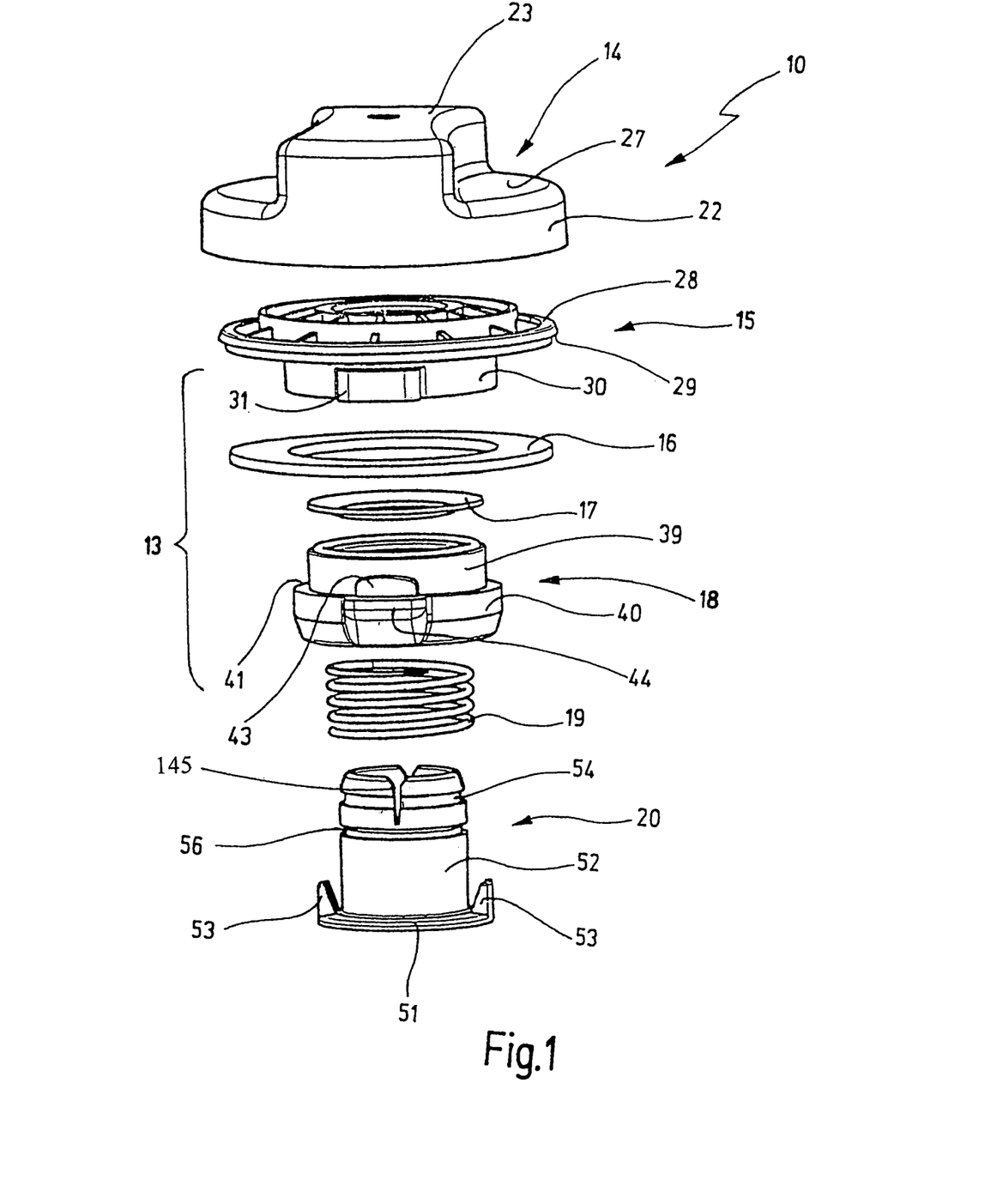
FIG. 1, in an exploded perspective view, the individual components of a closure cap for the filler neck of a fuel tank, in accordance with a preferred exemplary embodiment of the present invention.
Figure 2:
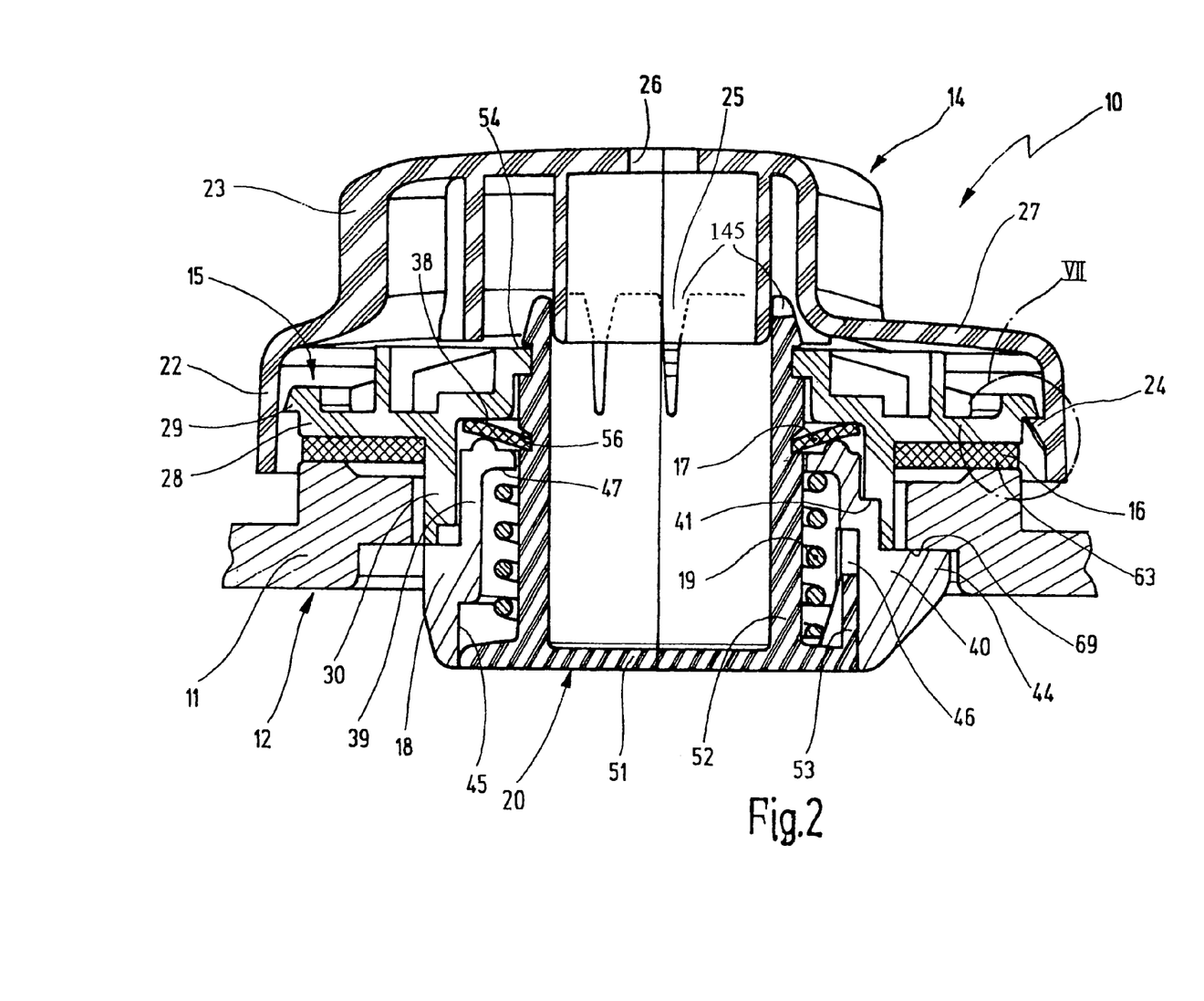
FIG. 2, a longitudinal section through the closure cap of FIG. 1, but in the assembled state and in a state in which a tank filler neck is tightly closed.

According to FIG. 1, the closure cap 10 essentially comprises a grip 14, a sealing part 15 with a sealing ring 16, a ring seal 17, a tightening part 18, a compression spring 19, and a shaft 20. In the assembled state, as is shown in FIG. 2, the shaft penetrates the compression spring 19 and the tightening part 18 and after that is equipped with the ring seal 17. The shaft 20 furthermore penetrates both the sealing ring 16 and the sealing part 15 that provided with the sealing ring 16, and the shaft is connected by its applicable end to the sealing part 15 in locking fashion, such that an axially fixed but circumferentially rotatable connection between the shaft 20 and the sealing part 15 is obtained. The applicable end of the shaft 20 is also connected to the grip 14 in a manner fixed against relative rotation and is fixed in the axial direction on the grip 14 in that the sealing part 15 is made in the underside shown in FIG. 1 of the grip 14 in such a way that it is axially fixed and is rotatable in the circumferential direction.

In the exemplary embodiment, the grip 14 is made in one piece of plastic and comprises an approximately cup-shaped underside 22 as well as a grip knob 23 that is designed as longitudinally rectangular, with suitable concave side regions. On the inside, the cup-shaped underside 22 has detent elements 24, in this case four of them, distributed or integrally formed uniformly over the inner circumference, for axially fixed yet rotatable, locking reception of the sealing part 15. The grip 14 on the inside, in the region of the hollow grip knob 23, has diagonally opposed ribs 25, in this case four of them, which serve the purpose of connection to the shaft 20 in a manner fixed against relative rotation. A bore 26 centrally in the grip knob 23 serves to receive a chain or strip for retaining the closure cap 10 in captive fashion on the applicable filler neck or container.

Figure 3:
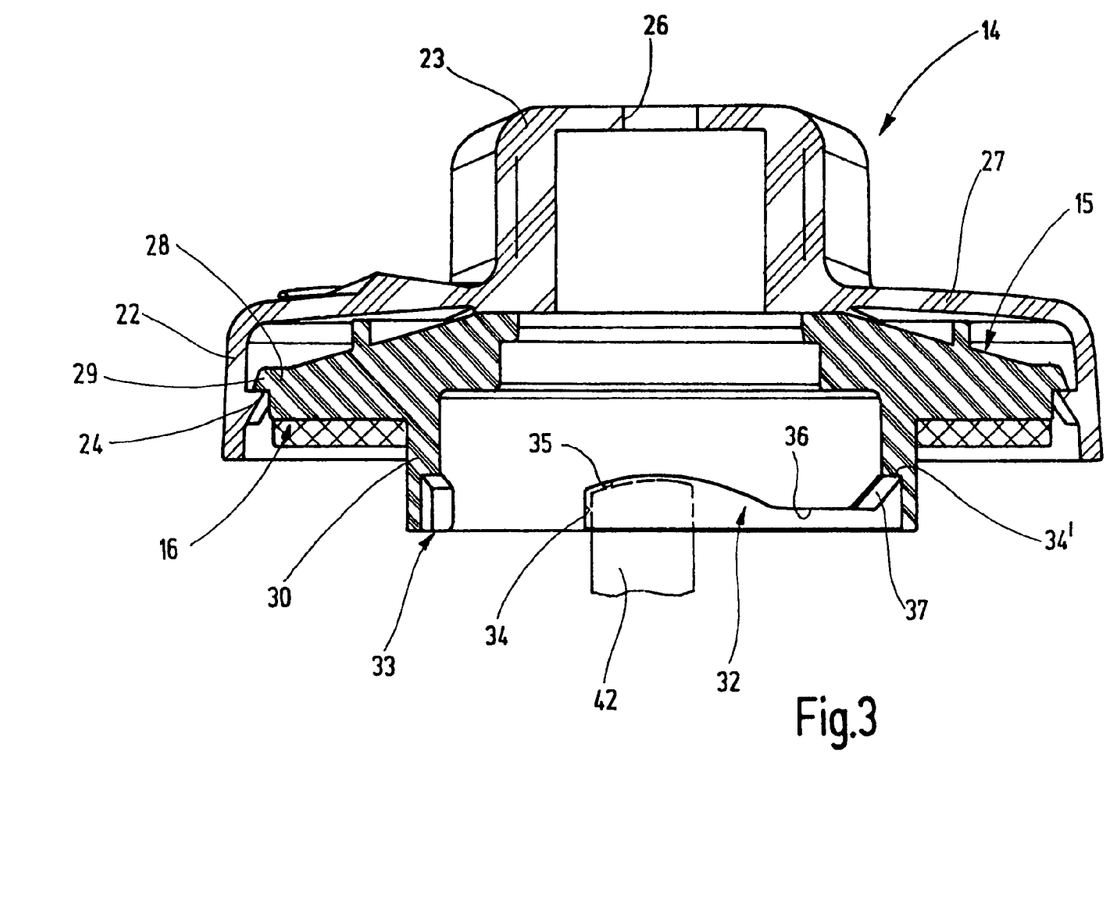
FIG. 3, a longitudinal section corresponding to that of FIG. 2, but in a position of the closure cap rotated relative to it by 90°, and without the tightening part or the filler neck.
Figure 4:
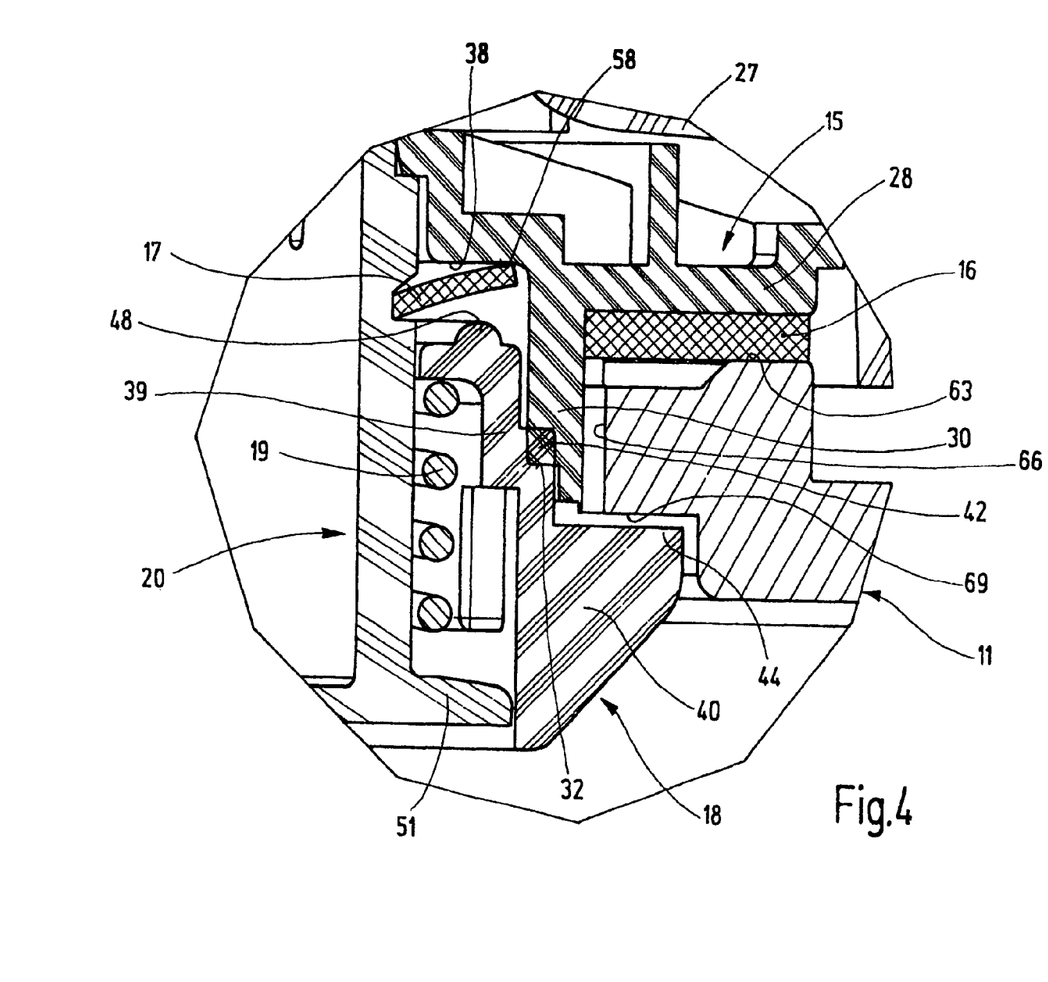
FIG. 4, in an enlarged view, a detail enclosed by the circle IV in FIG. 2, but in an intermediate position of the closure cap as it is being screwed onto or off from the tank filler neck.

The sealing part 15, which is in one piece of plastic, has an annular disk 28, which is provided with an undercut circumferential edge 29 that serves the purpose of locking in the grip 14 or behind the detent elements 24 of the grip 14, in such a way that the annular disk 28 is axially firmly held on the grip 14; via axial struts, it presses against a bottom 27 of the cup-shaped underside 22 and is held freely rotatably in the circumferential direction. The annular disk 28 is provided with a cylindrical motion-transmitting extension 30, whose inside diameter is larger than that of the central bore in the annular disk 28, so that an inner shoulder 38 is created. The motion-transmitting extension 30 is provided with rotation-locking lugs 31 on two diametrically opposed outer circumferential regions, which protrude radially and have a certain width in the circumferential direction and originate in the axial direction at the free end of the motion-transmitting extension 30 and which leave an axial space free between them and the surface of the annular disk 28. It is in this free space that the sealing ring 16, placed on the annular disk 28, is held between the annular disk and the sealing rotation-locking lugs 31. The motion-transmitting extension 30 is provided on its inside with two identical, diametrically opposed sliding-block paths 32, 33, which act in the axial direction (FIG. 3). The sliding-block paths 32, 33 are made in the wall of the motion-transmitting extension 30 in the axial direction from its free end inward, in such a way that they occupy approximately half the thickness of the wall of the motion-transmitting extension 30. Each of the sliding-block paths 32, 33 begins in the region of one side of one rotation-locking lug 31 and extends along its width across a circumferential angle of 90°. On both ends, the sliding-block path 32, 33 has a respective end stop 34 and 34'. The sliding-block path 32, 33 has a symmetrical course at 45° with regard to its center; that is, a first path portion 35 begins at the 0° stop 34 at a certain axial width and then changes over, rising, to a second path portion 36, which viewed axially has a lesser depth and extends uniformly to both sides of the 45° center; after that, a third path portion 37 adjoins it, extending symmetrically to the first path portion and hence downward and ends at the other 90° stop 34'. The two sliding-block paths path portion 32 and 33 are offset circumferentially from one another by 180°.

The tightening part 18, which is likewise in one piece of plastic, has an outer, smaller-diameter, first annular portion 39 and a second annular portion 40 of larger outer diameter, the first of which in the assembled state plunges into the motion-transmitting extension 30 of the sealing part 15, where it is held movably in the axial and circumferential directions. With its shoulder 41 between the two annular portions 39 and 40, the tightening part 18 rests on the free face end of the motion-transmitting extension 30 in the assembled state. In this state, for instance as in FIG. 2, two cams 42 and 43, which are integrally formed onto the outer circumference, diametrically radially from the first annular portion 39 and axially from the shoulder 41, plunge into the respective sliding-block path 32 and 33 in the sealing part 15.

As will be described hereinafter, the tightening part 18 is moved back and forth in the axial direction upon a relative motion 90° relative to the sealing part 15, because of its cams 42, 43 and the sliding-block paths 32, 33. The sealing part 15 and the tightening part 18 thus form a rotary lifting device 13.

In the circumferential region of the cams 42, 43, the second annular portion 40 has diametrically opposed locking lugs 44, protruding radially from its circumferential side, which in the assembled outset state are aligned in the axial direction with the rotation-locking lugs 31 of the sealing part 15. In the exemplary embodiment, the circumferential width of the locking lugs 44 is therefore equal to the circumferential width of the rotation-locking lugs 31.

On the inside circumference, the second annular portion 40 is provided both with an annular recess 45 and with two diametrically opposed axial grooves 46. Both recesses 45 and 46 extend, viewed radially, over a portion of the wall thickness of the second annular portion 40. The annular recess 45 begins at the free annular face end of the second annular portion 40, and the grooves 46 adjoin it. The axial grooves 46 rest on the circumference in the region of the locking lugs 44.

The plastic shaft 20 is hollow and on its end has a cover plate 51, whose diameter is greater than the outer diameter of a cylindrical portion 52 of the shaft 20; the two parts are disposed concentrically to one another. The diameter of the cover plate 51 is such that the cover plate can plunge, axially movably, into the annular recess 45 of the second annular portion 40 of the tightening part 18. Diametrically opposed regions of the cover plate 51 are provided with fingers 53, protruding axially from its underside, which are capable of plunging into the axial grooves 46 in the second annular portion 40 of the tightening part 18, as a result of which the tightening part 18 is retained on the shaft 20 on the one hand in a manner fixed against relative rotation but on the other hand axially movably. The compression spring 19, which surrounds the cylindrical portion 52 of the shaft 20, is retained between the cover plate 51 and an inner shoulder 47 of the first annular portion 39 of the tightening part 18.

The cylindrical portion 52 of the shaft 20, on its free end, on the one hand has a detent annular groove 54, which receives the inner edge of the annular disk 28 of the sealing part 15 axially fixedly but circumferentially rotatably. This end furthermore here has four axial slots 145, diametrically opposite one another in pairs, which are engaged for the connection fixed against relative rotation by the ribs 25 of the grip 14. On the cylindrical portion 52 of the shaft 20, axially spaced apart from the detent annular groove 54, a receiving annular groove 56 is also provided, and the ring seal or rubber seal 17 is received in it, and in a manner to be described hereinafter provides for container ventilation at underpressure.

Figure 6:
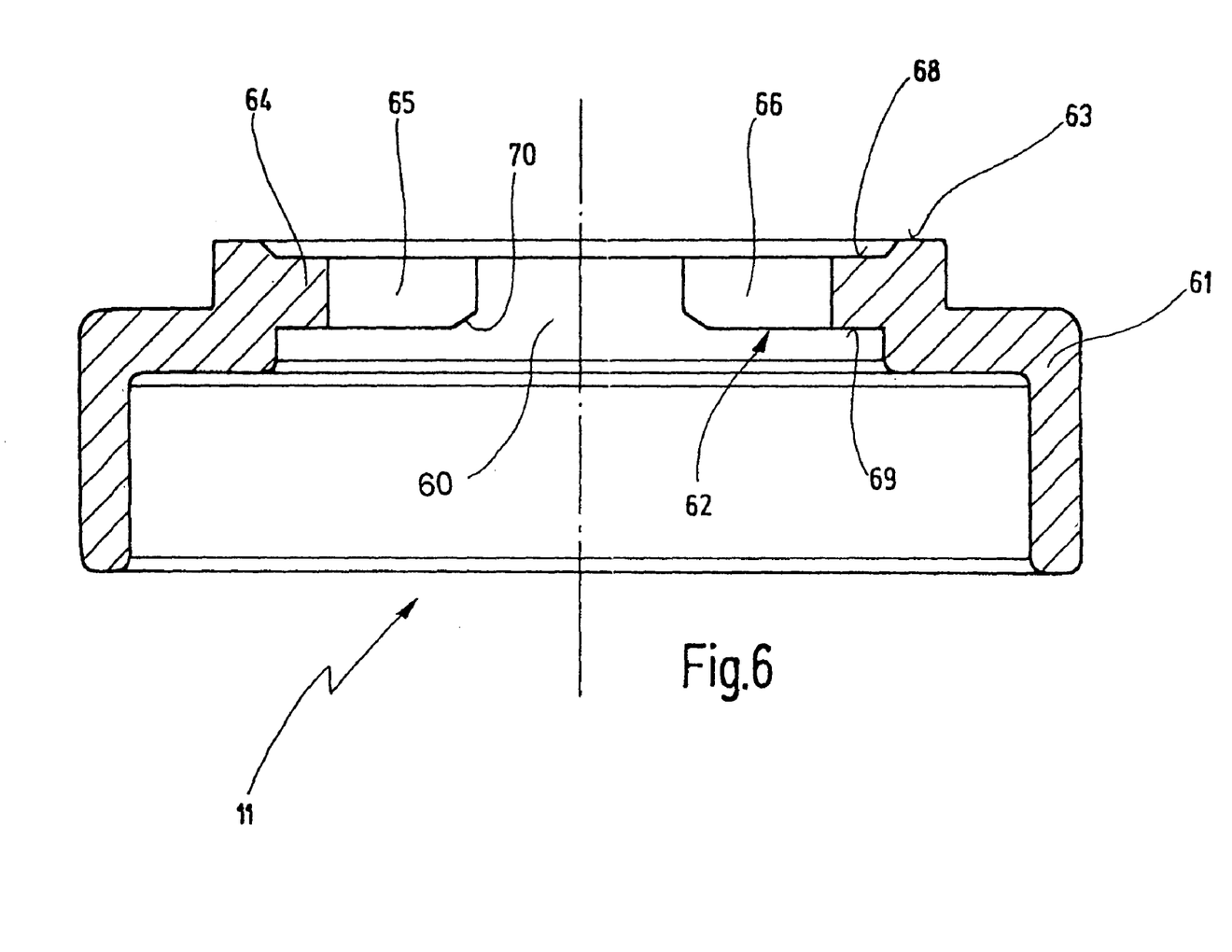
FIG. 6, in an enlarged view, a section through a container neck in a first exemplary embodiment of the present invention, for use with a closure cap of FIG. 2 or FIG. 3.

FIG. 6 in conjunction with FIG. 2 shows a filler neck 11, or an extension end of a filler neck, which has typical external dimensions. The filler neck 11 has a tubular part 61, which either merges with the container in question or is secured to a filler tube extension from the container 12. The tubular part 61 tapers on its free end to form a closure base 62, which has an annular sealing face 63 which surrounds the neck opening 60 and is in turn adjoined radially inward and axially offset by a locking edge 64. This locking edge 64 is provided, in two diametrically opposed regions, with a radial recess 65, 66, into which when the closure cap 10 is put in place the aligned rotation-locking lugs 31 and locking lugs 44 plunge. In the exemplary embodiment shown, the annular sealing face 63, against which the sealing ring 16 on the sealing part 15 presses, is embodied as a flat plane face. Besides having a plane top side 68, the locking edge 64 in particular also has a plane or flat underside 69. The axial thickness of the locking edge 64 is approximately equal to the axial height of the rotation-locking lugs 31 of the sealing part 15. The underside 69 has a chamfer 70 at the transition to the inner circumference of the locking edge 64.

If the assembled closure cap 10, in the outset position, in which the rotation-locking lugs 31 of the sealing part 15 and the locking lugs 44 of the tightening part 18 are located axially one above the other or in other words are aligned, is placed on this filler neck 11, then the rotation-locking lugs 31 get into the radial recesses 65 of the locking edge 64 of the closure base 62 and are received there with circumferential play and the locking lugs 44 to under the locking edge 64. With the rotation of the closure cap 10 at the grip knob 23 of the grip 14, the sealing part 15 is firmly retained so that the sealing ring 16 itself remains nonrotatable as well. Since the tightening part 18 is connected to the grip 14 in a manner fixed against relative rotation and is free from the locking edge 64, the tightening part 18 rotates relative to the sealing part 15, and as a result, the rotary lifting device 13 comes into action. In other words, the cams 42 and 43 of the tightening part 18 move along the sliding-block paths 32 and 33 of the fixed sealing part 15, so that the tightening part 18, counter to the action of the compression spring 19, moves axially in the direction of the cover plate 51 of the shaft 20 and along the shaft 20. As a result, the locking lugs 44, with an axial spacing from the underside 69 of the locking edge 64, move in the circumferential direction along this underside 69. At the end of this 90° rotary motion of the tightening part 18, the cams 42 and 43, from the second path portion 36 that has caused the axial motion, get into the lower-lying third path portion 37 under the influence of the compression spring 19, which means that the locking lugs 44 are actively pressed against the underside 69 of the locking edge 64, and as a result the sealing ring 16 is sealingly pressed in the axial direction on the annular sealing face 63 of the closure base 62 of the filler neck 11. In this closing position shown in FIG. 2, the locking lugs 44 are offset by 90° from the rotation-locking lugs 31.

The release of the closure cap 10 from the filler neck 11 is done correspondingly in reverse and once again the tightening part 18 with its locking lugs 48 is lifted in the axial direction from the closure base 62 and, after a contrary 90° rotation, is set down on the sealing part 15. This means that the sealing ring 16 relative to the annular sealing face 63 of the filler neck 11 always completes only an axial motion but not a rotary motion relative to it. Depending on the design of the first and third path portions 35, 37, the setting-down motion of the tightening part can make the locking action audible.

An essential aspect in this connection is that the filler neck 11 can in this way be made from a molded or cast part, and the plane faces 63 and 69 can be created either by the production of the cast part or by postmachining. Since the sealing ring 16 is pressed by the active axial motion against the plane annular sealing face 63, it is not necessary—as in filler necks that were conventional until now—to provide a narrower sealing face that is provided by means of arching.

Figure 7:
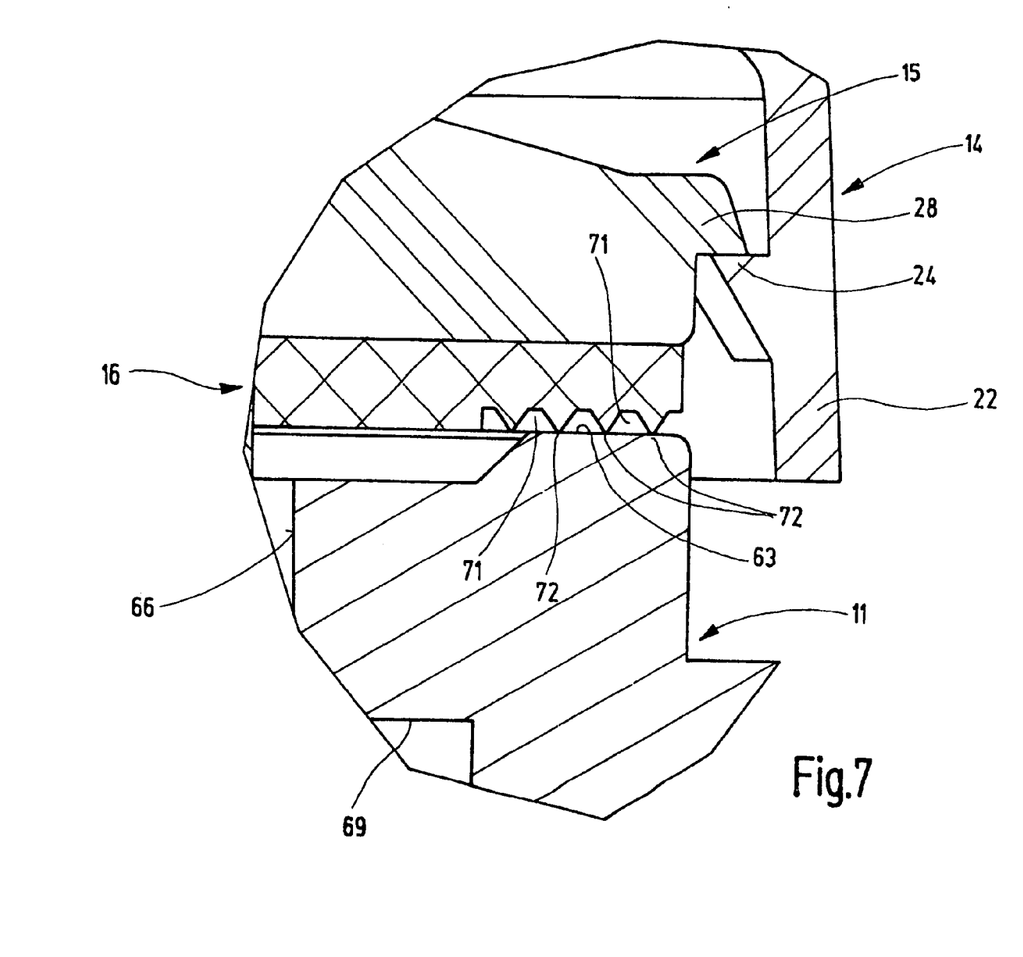
FIG. 7, in an enlarged view of the detail enclosed in the circle VII in FIG. 2, in a further feature, the sealing connection of the closure cap and the filler neck.

In the exemplary embodiment of FIG. 7, the sealing ring 16 can therefore be embodied as a molded part; in this case, the purely sealing face region can be interrupted by annular grooves 71, so that annular sealing face regions 72 remain, which can enter into gas-tight, liquid-tight, and pressure-tight connection with the annular sealing face 63 of the filler neck 11. This is accomplished over a relatively wide annular sealing face of several millimeters in width, for instance, on the filler neck 11.

Figure 5:
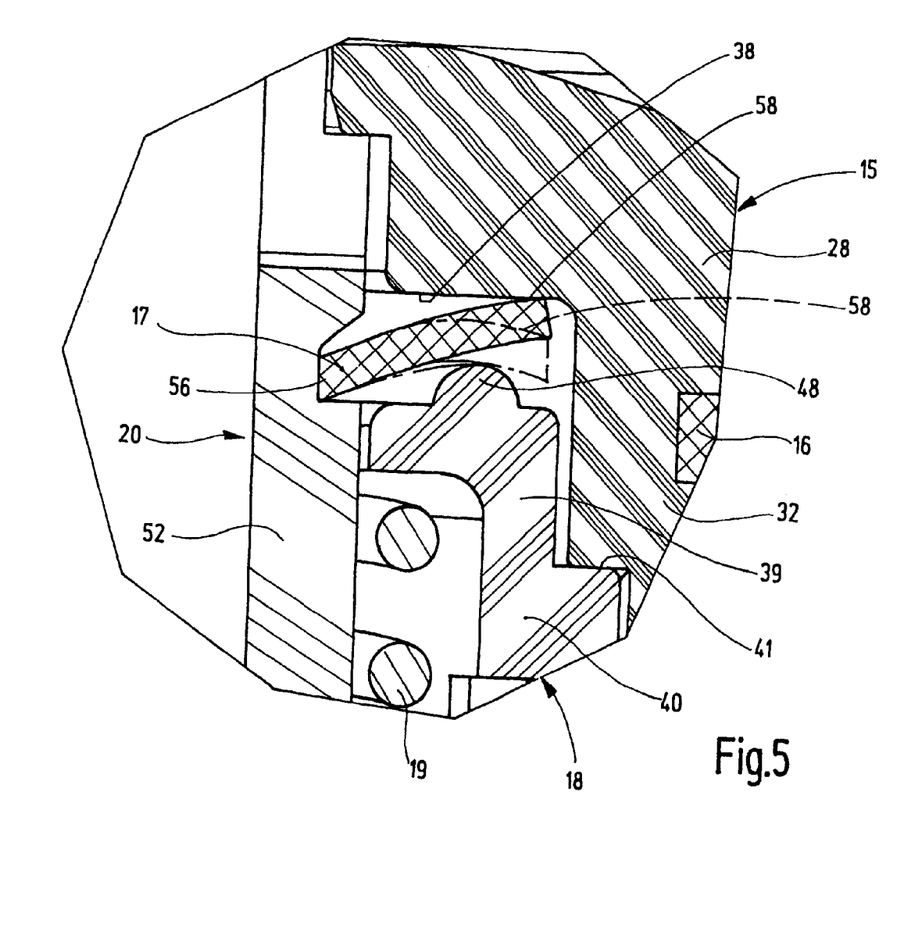
FIG. 5, a view similar to FIG. 4 and in further detail reduction and enlarged, the state and FIG. 2 showing further version of the present invention.

In FIG. 5, in accordance with a further exemplary embodiment, the action of the ring seal 17, which is embodied as a rubber seal, can be seen. This rubber seal 17, which is retained on the cylindrical portion 52 of the shaft 20 in the receiving annular groove 56 thereof, is embodied such that it is curved in convex fashion in the radial direction toward the inner shoulder 38 of the sealing part 15, which here forms an axial sealing face, and there presses with its outer edge region 58 with intrinsic tension (solid lines). Axially diametrically opposite, on the tightening part 18 or on the face end of its first annular portion 39, an axially protruding annular bead 48 is provided, which in the assembled state is at a slight axial spacing from the rubber seal 17. Whenever an underpressure is built up in the container 12 communicating with the filler neck 11, this annular bead 48 serves to ventilate the container 12. If an underpressure occurs, the outer peripheral region of the ring seal 17 is aspirated and is pressed against the annular bead 48, and is possibly bent somewhat past this annular bead 48, as a result of which the sealing face 58 of the ring seal 17 lifts (dot-dashed lines) from the sealing face of the inner shoulder 38 of the sealing part 15 and as a result creates an air communication between the outer region and the inner region of the container 12. Depending on the radial position and axial closeness of the annular bead 48 to the rubber seal 17, the level of the underpressure in the container 12 at which a deflection of the rubber seal 17 and thus a ventilation of the container 12 occur can be selected.

It is understood that the above-described closure cap 10 can be used not only in the filler neck 11 described in conjunction with FIG. 6 but also in currently usual filler necks, which in particular are provided with a sliding-block path on the inside of the locking edge 64 for commercially available closure caps.

The invention claimed is:

1. An underpressure ventilation device, in particular on a closure cap for the filler neck of a container, in particular of a container for fuel or motor oil for motor vehicles, having:
   a grip;
   a rotary lifting device whose one part (sealing part), oriented toward said grip, is provided with a sealing ring and whose other part (tightening part), remote from said grip is provided with locking lungs for engaging the closure cap of the filler neck from below, is rotatable relative to the filler neck upon a rotary motion of the closure cap, and upon the rotary motion of said grip, the other part (tightening part) is axially movable relative to said one part (sealing part) of said rotary lifting device counter to the force of a spring, in such a manner that in the closing position of the closure cap on the filler neck, the sealing ring provided on the one part (sealing part) is pressed against a sealing face of the filler neck, and during the motion of said grip, an axial play exists between the sealing faces of said sealing ring and of the filler neck; and
   a rotation-locking connection, wherein:
   said one part (sealing part) with the axially acting sealing ring, upon a rotary motion of the closure cap relative to the filler neck, remains nonrotatable with the filler neck by means of said rotation-locking connection;
   said one part (sealing part) and said other part (tightening part) are penetrated by a shaft, which is connected in a manner fixed against relative rotation to said grip on one end and to said other part (tightening part) on the other end; and
   in that said shaft on the outer circumference has a sealing ring disk, which is axially retained on the inner edge on said shaft and is placed on the outer edge against an axial sealing face on said one part (sealing part) with intrinsic tension.

2. The underpressure ventilation device as defined by claim 1 wherein:
   said one part (sealing part), provided with at least one rotation-locking connection element, is solidly connected to a radial flange which is retained axially immovably but rotatably in said grip.

3. The underpressure ventilation device as defined by claim 1, wherein:
   said other part (tightening part), provided with the locking lugs, is embodied as a ring element and is disposed plunging axially partway into a ring element of said one part (sealing part).

4. The underpressure ventilation device as defined by claim 3, wherein:
   said two ring elements, on their regions plunging into one another, are provided with sliding-block elements, acting in the direction of rotation, in the form of at least one sliding-block and at least one cam.

5. The underpressure ventilation device as defined by claim 3, wherein:
   said spring is disposed in the form of a compression spring between said other part (tightening part) and said shaft.

6. The underpressure ventilation device as defined by claim 1, wherein:
   said locking lugs of said other part (tightening part) and said rotation-locking connection elements of said one part (sealing part) each have approximately the same width in the circumferential direction.

7. The underpressure ventilation device as defined by claim 1, wherein:
said sealing ring is embodied as a molded part, with toothed sealing face regions optionally oriented toward the filler neck.

8. The underpressure ventilation device as defined by claim 1, wherein:
said sealing ring disk is embodied as curved convexly toward said axial sealing face.

9. The underpressure ventilation device as defined by claim 1, wherein:
on the side of said sealing ring disk remote from said axial sealing face, an annular bead is disposed on said other part (tightening part), in a region between the inner and outer edges of said sealing ring disk.

10. The underpressure ventilation device as defined by claim 9, wherein:
said annular bead is disposed at a slight axial spacing from the applicable face region, oriented toward it, of said sealing ring disk.

11. A closure cap for the filler neck of a container, in particular of a container for fuel or motor oil for motor vehicles, having:
a grip;
a rotary lifting device whose one part (sealing part), oriented toward said grip, is provided with a sealing ring and whose other part (tightening part), remote from said grip is provided with locking lugs for engaging the closure cap of the filler neck from below is rotatable relative to the filler neck upon a rotary motion of the closure cap, and upon the rotary motion of said grip, the other part (tightening part) is axially movable relative to said one part (sealing part) of said rotary lifting device counter to the force of a spring, in such a manner that in the closing position of the closure cap on the filler neck, the sealing ring provided on the one part (sealing part) is pressed against a sealing face of the filler neck, and during the motion of said grip, an axial play exists between the sealing faces of said sealing ring and of the filler neck; and
a rotation-locking connection, wherein:
said one part (sealing part) with the axially acting sealing ring, upon a rotary motion of the closure cap relative to the filler neck, remains nonrotatable with the filler neck by means of said rotation-locking connection;
one part (sealing part) and said other part (tightening part) are penetrated by a shaft, which is connected in a manner fixed against relative rotation to said grip on one end and to said other part (tightening part) on the other;
said shaft is a cylindrical body, which is provided with a cover plate and whose open end, by means of axial slots engaging via ribs of said grip, forms a rotation-locking connection with said grip on the one hand, and whose closed end, by means of fingers axially protruding from said cover plate and engaging inner axial recesses of said other part (tightening part), forms a rotation-locking connection with said other part on the other hand.

12. A closure cap for the filler neck of a container, in particular of a container for fuel or motor oil for motor vehicles, having:
a grip;
a rotary lifting device whose one part (sealing part), oriented toward said grip, is provided with a sealing ring and whose other part (tightening part), remote from said grip is provided with locking lugs for engaging the closure cap of the filler neck from below is rotatable relative to the filler neck upon a rotary motion of the closure cap, and upon the rotary motion of said grip, the other part (tightening part) is axially movable relative to said one part (sealing part) of said rotary lifting device counter to the force of a spring, in such a manner that I
n the closing position of the closure cap on the filler neck, the sealing ring provided on the one part (sealing part) is pressed against a sealing face of the filler neck, and during the motion of said grip, an axial play exists between the sealing faces of said sealing ring and of the filler neck; and
a rotation-locking connection, wherein:
said one part (sealing part) with the axially acting sealing ring, upon a rotary motion of the closure cap relative to the filler neck, remains nonrotatable with the filler neck by means of said rotation-locking connection, wherein:
said other part (tightening part, provided with the locking lugs, is embodied as a ring element and is disposed plunging axially partway into a ring element of said one part (sealing part); wherein:
said spring is disposed in the form of a compression spring between said other part (tightening part) and said shaft, and
wherein: said shaft enters into an axially acting detent connection with said one part (sealing part).

* * * * *